(12) United States Patent
Frykberg et al.

(10) Patent No.: US 12,247,757 B2
(45) Date of Patent: Mar. 11, 2025

(54) DOOR UNIT FOR AN AIR CONDITIONING SYSTEM, AN AIR CONDITIONING SYSTEM, AND A METHOD FOR OPERATING AN AIR CONDITIONING SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Emil Frykberg, Gothenburg (SE); Mikael Jönsson, Onsala (SE); Kristian Nicklasson, Åsa (SE); Henrik Fellbom, Gothenburg (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 304 days.

(21) Appl. No.: 17/872,215

(22) Filed: Jul. 25, 2022

(65) Prior Publication Data

US 2022/0373221 A1 Nov. 24, 2022

Related U.S. Application Data

(63) Continuation of application No. PCT/CN2021/073826, filed on Jan. 26, 2021.

(30) Foreign Application Priority Data

Feb. 4, 2020 (EP) ..................................... 20155404

(51) Int. Cl.
*F24F 13/10* (2006.01)
*F24F 11/00* (2018.01)

(52) U.S. Cl.
CPC .......... *F24F 13/10* (2013.01); *F24F 11/0001* (2013.01)

(58) Field of Classification Search
CPC ............................. F24F 13/10; F24F 11/0001
See application file for complete search history.

(56) References Cited

U.S. PATENT DOCUMENTS 5,062,352 A 11/1991 Ostrand
5,176,567 A * 1/1993 Piritore ................. F24F 13/072
454/305

(Continued)

FOREIGN PATENT DOCUMENTS

CN 2866215 Y 2/2007
CN 103298633 A 9/2013

(Continued)

OTHER PUBLICATIONS

International Search Report from International Application No. PCT/CN2021/073826, Apr. 25, 2021, 3 pages.

*Primary Examiner* — Henry T Crenshaw
(74) *Attorney, Agent, or Firm* — Tucker Ellis LLP

(57) ABSTRACT

A door unit for an air conditioning system includes a stationary inner screen part, an outer casing part rotatable between different operational positions in relation to the inner screen part, and a flap member attached to the outer casing part. The outer casing part includes first and second inlet openings. The door unit directs a first flow of air in a first air flow channel and a second flow of air in a second air flow channel to a third air flow channel or to the third air flow channel and a fourth air flow channel. The flap member blocks the first air flow channel or the second air flow channel, wherein an internal volume of the door unit enclosed by the inner screen part and the outer casing part forms the fourth air flow channel.

17 Claims, 12 Drawing Sheets

(56) References Cited

U.S. PATENT DOCUMENTS

| | | | |
|---|---|---|---|
| 5,685,162 A | | 11/1997 | Iritani |
| 5,873,256 A | * | 2/1999 | Denniston .......... B60H 1/00414 62/271 |
| 9,242,528 B2 | | 1/2016 | Graaf |
| 10,350,962 B2 | * | 7/2019 | Wiesmann ........... B60H 1/0005 |
| 2019/0092126 A1 | | 3/2019 | Klinkhammer |
| 2019/0329630 A1 | * | 10/2019 | Ren ..................... B60H 1/3414 |

FOREIGN PATENT DOCUMENTS

| | | |
|---|---|---|
| CN | 104417316 A | 3/2015 |
| CN | 105522887 A | 4/2016 |
| CN | 107839441 A | 3/2018 |
| CN | 110154673 A | 8/2019 |
| CN | 209795119 U | 12/2019 |
| EP | 1334850 A1 | 8/2003 |
| FR | 2833533 A1 | 6/2003 |
| FR | 3049237 A1 | 9/2017 |
| JP | 2000177361 A | 6/2000 |
| JP | 2008155654 A | 7/2008 |
| JP | 2017154532 A | 9/2017 |
| KR | 20050112776 A | 12/2005 |
| KR | 20110011100 A | 2/2011 |
| KR | 20130050451 A1 | 5/2013 |

* cited by examiner

DOOR UNIT FOR AN AIR CONDITIONING SYSTEM, AN AIR CONDITIONING SYSTEM, AND A METHOD FOR OPERATING AN AIR CONDITIONING SYSTEM

RELATED APPLICATION DATA

This application is a continuation of International Patent Application No. PCT/CN2021/073826, filed Jan. 26, 2021, which claims the benefit of European Patent Application No. 20155404.5, filed Feb. 4, 2020, the disclosures of which are incorporated herein by reference in their entireties.

TECHNICAL FIELD

The present disclosure relates to a door unit for an air conditioning system, where the air conditioning system is arranged for the treatment of air to a passenger compartment of a vehicle. The system comprises a housing structure with a first air flow channel for a first flow of air, and a second air flow channel for a second flow of air. A first heat exchanger is arranged in the first air flow channel, and a second heat exchanger is arranged in the second air flow channel.

The disclosure further relates to an air conditioning system for the treatment of air to a passenger compartment of a vehicle, and a method for operating an air conditioning system for the treatment of air to a passenger compartment of a vehicle.

BACKGROUND

Air conditioning systems with heat exchangers are commonly used in automotive climate system applications. The air conditioning systems are providing climate comfort to the driver and passengers in the passenger compartment of the vehicle, and climate systems are improving the riding experience and the comfort for the driver and the passengers. Today's modern system are offering many different climate options, and when hot air is generated by the system to the passenger compartment, cold air needs to be dumped to the ambient environment. In the opposite way, when cold air is generated by the system to the passenger compartment, hot air needs to be dumped to the ambient environment. To establish the different climate options and the possibility to dump air to the ambient environment, the air conditioning systems are complex in construction and involve a high number of components, such as for example heat exchangers, refrigerant circuits with different components, fan units, filters, and door units. The door units are used for controlling the different air flows of the systems, and a high number of door units are needed to establish the different system functions. The door units are commonly arranged as traditional flaps integrated in the system architecture, and the door units are controlled by a control unit or control module being part of the vehicle climate system. The total volume needed for housing the air conditioning systems in the vehicle is therefore high due to the high number of components involved and the need for dumping air to the ambient environment.

There is thus a need for an improved door unit configuration, air conditioning system configuration, and method for operating the air conditioning system.

SUMMARY

An object of the present disclosure is to provide a door unit for an air conditioning system, an air conditioning system for the treatment of air to a passenger compartment of a vehicle, and a method for operating an air conditioning system for the treatment of air to a passenger compartment of a vehicle, where the previously mentioned problems are avoided. This object is at least partly achieved by the features of the independent claims. The dependent claims contain further developments of the door unit, the air conditioning system, and the method.

The disclosure concerns a door unit for an air conditioning system. The door unit comprises a stationary inner screen part, an outer casing part rotatably arranged between different operational positions in relation to the inner screen part, and a flap member attached to the outer casing part. The outer casing part comprises a first inlet opening and a second inlet opening. The door unit is configured for directing a first flow of air in a first air flow channel and a second flow of air in a second air flow channel to a third air flow channel, or to the third air flow channel and a fourth air flow channel. The flap member is configured for blocking the first air flow channel or the second air flow channel, and an internal volume of the door unit enclosed by the inner screen part and the outer casing part is configured for forming the fourth air flow channel. The outer casing part is configured for directing the first flow of air to the fourth air flow channel via the first inlet opening and for directing the second flow of air to the fourth air flow channel via the second inlet opening.

Advantages with these features are that the unique configuration and design of the door unit is providing an efficient and compact solution for the distribution of air into the passenger compartment, or to the passenger compartment and the ambient environment, where only a single door unit is needed for the distribution of the different air flows. With the compact solution and the multi-functionality of the door unit, the air conditioning system can be made with a smaller volume, which is improving the packing possibilities of vehicle constructions. The design and function of the door unit is further providing an improved possibility to design and manufacture air conditioning systems with fewer components involved.

According to an aspect of the disclosure, the outer casing part is rotatably arranged in relation to the inner screen part, where the outer casing part is configured for rotating around a rotational axis extending in a rotational axis direction. The rotatable arrangement is providing a simple, reliable and efficient control of the air conditioning system, where the system depending on the rotational position of the outer casing part in relation to the inner screen part can be operated in different modes for an efficient climate control functionality.

According to another aspect of the disclosure, the inner screen part comprises a screen wall having an extended configuration in the rotational axis direction and arranged for partly extending around the rotational axis. The outer casing part comprises a side wall, an open base part and a top wall, where the side wall is having an extended configuration in the rotational axis direction and arranged for extending around the rotational axis. The base part is configured for forming a flow outlet of the fourth air flow channel to the ambient environment. This configuration is forming a compact and efficient solution, where the door unit is used not only for directing the first flow of air and the second flow of air in different system operational modes, but also forming the fourth air flow channel without the need for further components.

According to an aspect of the disclosure, the first inlet opening and the second inlet opening are arranged in the side wall. The first inlet opening and the second inlet opening are having elongated configurations extending in the rotational axis direction, or extending essentially in the rotational axis direction. The elongated configurations of the inlet openings are providing an efficient air distribution into the fourth air flow channel when desired.

According to another aspect of the disclosure, the outer casing part is having a frustoconical-like configuration or cylindrical-like configuration. These configurations are simple in construction for an efficient production of the outer casing part.

According to an aspect of the disclosure, the flap member is having a flat configuration with an extension in a plane parallel to the rotational axis direction or in a plane arranged at a flap angle in relation to the rotational axis direction. With the angled configuration, air flows with different temperatures can be distributed to different parts of the passenger compartment.

According to another aspect of the disclosure, the flap member is having a non-planar shaped configuration with an extension in the rotational axis direction. The non-planar shaped configuration is adapted for controlling an air flow quantity distribution between the first flow of air and the second flow of air in the rotational axis direction into the third air flow channel. With the non-planar shaped configuration, air flows with different temperatures can be distributed to different parts of the passenger compartment.

According to a further aspect of the disclosure, the outer casing part comprises one or more guide vanes, where the one or more guide vanes are intersecting the flap member. The guide vanes are used for efficiently distributing the first flow of air and/or the second flow of air into the third air flow channel.

The disclosure further concerns an air conditioning system for the treatment of air to a passenger compartment of a vehicle. The system comprises a housing structure with a first air flow channel for a first flow of air, a second air flow channel for a second flow of air, a third air flow channel, and a fourth air flow channel. A first heat exchanger is arranged in the first air flow channel and a second heat exchanger is arranged in the second air flow channel. The system further comprises a door unit as described above, where the door unit is configured for directing the first flow of air and the second flow of air to the passenger compartment via the third air flow channel, or to the passenger compartment via the third air flow channel and the ambient environment via the fourth air flow channel. The inner screen part of the door unit is stationary arranged in relation to the housing structure, and the outer casing part of the door unit is rotatably arranged between different operational positions in relation to the inner screen part and the housing structure. An internal volume of the door unit enclosed by the inner screen part and the outer casing part is forming the fourth air flow channel. Advantages with these features are that the unique configuration and design of the air conditioning system with the door unit is providing an efficient and compact solution for the distribution of air into the passenger compartment, or to the passenger compartment and the ambient environment, where only a single door unit is needed for the distribution of the different air flows. With the compact solution and the multi-functionality of the door unit, the air conditioning system can be made with a smaller volume, and the design and function of the door unit is further providing an improved possibility to design and manufacture air conditioning systems with fewer components involved.

According to an aspect of the disclosure, the first heat exchanger is adapted for cooling the first flow of air and the second heat exchanger is adapted for heating the second flow of air. With the cooling and heating of the first and second air flows in the system, a high flexibility is achieved in the air conditioning system, where different temperatures in the flow of air to the passenger compartment can be established.

According to another aspect of the disclosure, the third air flow channel is formed by extensions of the first air flow channel and the second air flow channel. This configuration is allowing a compact and simple system architecture, where the door unit is arranged to control the flow of air from the first air flow channel and the second air flow channel into the third air flow channel.

According to a further aspect of the disclosure, the system further comprises a refrigerant circuit, where the first heat exchanger and the second heat exchanger are integrated into the refrigerant circuit. The first heat exchanger is arranged as an air evaporator in the refrigerant circuit and the second heat exchanger is arranged as an air condenser in the refrigerant circuit. The refrigerant circuit further comprises a compressor and an expansion valve. The refrigerant circuit is providing an efficient temperature control of the air flows of the system. If varying the output in the heat exchangers, the system temperatures can be efficiently controlled.

According to an aspect of the disclosure, the system further comprises at least one fan unit configured for establishing the first flow of air in the first air flow channel and the second flow of air in the second air flow channel. The fan unit is used for efficiently establishing the desired air flows in the air conditioning system.

According to another aspect of the disclosure, a first fan unit is arranged in the first air flow channel for establishing the first flow of air and a second fan unit is arranged in the second air flow channel for establishing the second flow of air. With the arrangement of separate fan units in the respective air flow channels, the air speeds can be varied independently of each other for establishing a desired climate in the passenger compartment.

According to a further aspect of the disclosure, in a first system operational mode the outer casing part is arranged in a first operational position in relation to the inner screen part. In the first operational position, the inner screen part is blocking the first inlet opening and the second inlet opening preventing the first flow of air and the second flow of air to flow into the fourth air flow channel. The flap member is in the first operational position allowing the first flow of air and the second flow of air to flow into the third air flow channel. The first operational mode is allowing a mix of the first flow of air and the second flow of air into the passenger compartment. If varying the flow speeds and temperatures of the air flows, a highly efficient system is achieved, where the temperature and speed of air distributed into the passenger compartment can be varied depending on desired climate in the passenger compartment.

According to an aspect of the disclosure, in a second system operational mode the outer casing part is arranged in a second operational position in relation to the inner screen part. In the second operational position, the inner screen part is blocking the second inlet opening preventing the second flow of air to flow into the fourth air flow channel and allowing the first flow of air to flow into the fourth air flow channel. The flap member in the second operational position is blocking the first air flow channel preventing the first flow of air to flow into the third air flow channel and allowing the second flow of air to flow into the third air flow channel. The second operational mode is used for a flow of hot air into the passenger compartment from the second flow of air. If varying the flow speed and temperature of the second flow of air, the temperature and air speed into the passenger compartment may be varied depending on desired climate in the passenger compartment.

According to another aspect of the disclosure, in a third system operational mode the outer casing part is arranged in a third operational position in relation to the inner screen part. In the third operational position, the inner screen part is blocking the first inlet opening preventing the first flow of air to flow into the fourth air flow channel and allowing the second flow of air to flow into the fourth air flow channel. The flap member in the third operational position is blocking the second air flow channel preventing the second flow of air to flow into the third air flow channel and allowing the first flow of air to flow into the third air flow channel. The third operational mode is used for a flow of cold air into the passenger compartment from the first flow of air. If varying the flow speed and temperature of the first flow of air, the temperature and air speed into the passenger compartment may be varied depending on desired climate in the passenger compartment.

The disclosure further concerns a method for operating an air conditioning system for the treatment of air to a passenger compartment of a vehicle. The system comprises a housing structure with a first air flow channel for a first flow of air and a second air flow channel for a second flow of air. The system further comprises a door unit configured for directing the first flow of air and the second flow of air to the passenger compartment via a third air flow channel, or to the passenger compartment via the third air flow channel and the ambient environment via a fourth air flow channel. The door unit comprises an inner screen part stationary arranged in relation to the housing structure, an outer casing part movably arranged between different operational positions in relation to the inner screen part, and a flap member attached to the outer casing part configured for blocking the first air flow channel or the second air flow channel. An internal volume of the door unit enclosed by the inner screen part and the outer casing part is forming the fourth air flow channel. The outer casing part comprises a first inlet opening and a second inlet opening, and the outer casing part is configured for directing the first flow of air to the fourth air flow channel via the first inlet opening and for directing the second flow of air to the fourth air flow channel via the second inlet opening. The method comprises the steps: based on detected environmental conditions controlling the first flow of air and the second flow of air by arranging the outer casing part with the flap member into operational positions. Advantages with these features are that the unique configuration and design of the door unit is providing an efficient operation of the system for the distribution of air into the passenger compartment, or to the passenger compartment and the ambient environment, where only a single door unit is needed for the distribution of the different air flows.

According to other aspects of the disclosure, the method further comprises the steps: in a first system operational mode arrange the outer casing part in a first operational position in relation to the inner screen part, where in the first operational position the inner screen part is blocking the first inlet opening and the second inlet opening preventing the first flow of air and the second flow of air to flow into the fourth air flow channel, where the flap member in the first operational position is allowing the first flow of air and the second flow of air to flow into the third air flow channel; and/or in a second system operational mode arrange the outer casing part in a second operational position in relation to the inner screen part, where in the second operational position the inner screen part is blocking the second inlet opening preventing the second flow of air to flow into the fourth air flow channel and allowing the first flow of air to flow into the fourth air flow channel, where the flap member in the second operational position is blocking the first air flow channel preventing the first flow of air to flow into the third air flow channel and allowing the second flow of air to flow into the third air flow channel; and/or in a third system operational mode arrange the outer casing part in a third operational position in relation to the inner screen part, where in the third operational position the inner screen part is blocking the first inlet opening preventing the first flow of air to flow into the fourth air flow channel and allowing the second flow of air to flow into the fourth air flow channel, where the flap member in the third operational position is blocking the second air flow channel preventing the second flow of air to flow into the third air flow channel and allowing the first flow of air to flow into the third air flow channel. The different system operational modes are providing an efficient distribution of air to the passenger compartment of the vehicle with a high number of operating options available, where the modes can be combined with for example different temperatures in the air flows and different air flow speeds.

BRIEF DESCRIPTION OF THE DRAWINGS

The disclosure will be described in detail in the following, with reference to the attached drawings, in which.

DETAILED DESCRIPTION

Figure 1A:
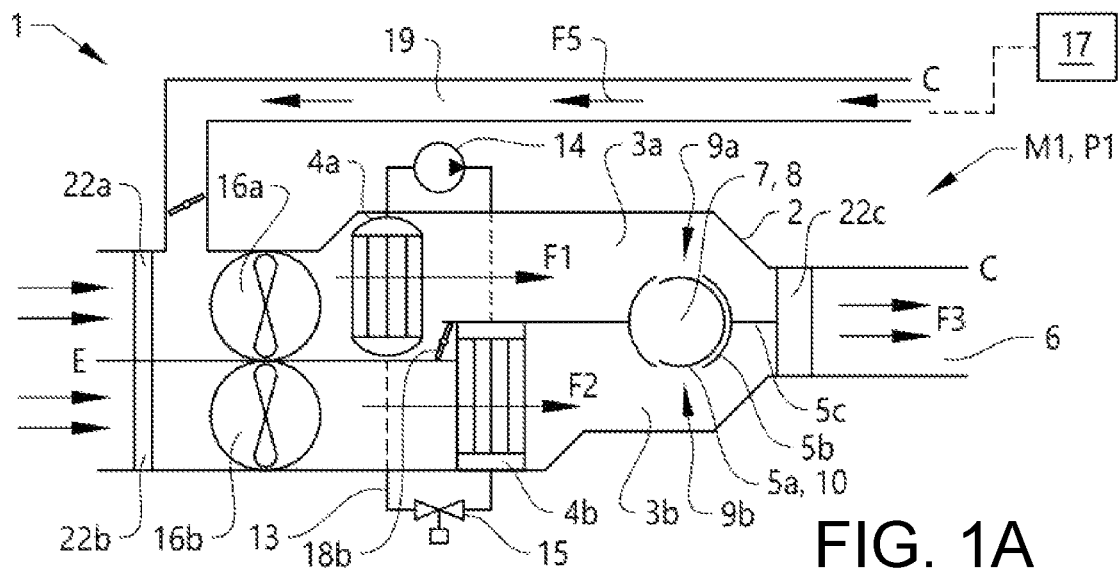
FIG. 1A-1C show schematically, in system layout views from above, an air conditioning system in a first system operational mode, a second system operational mode, and a third system operational mode according to the disclosure.

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

FIGS. 1A-1C and 2A-2C schematically show an air conditioning system 1 and a section of the air conditioning system 1 for the treatment of air to a passenger compartment C of a vehicle according to the disclosure. The air conditioning system 1 comprises a housing structure 2, which is arranged for enclosing and supporting the different components of the system 1. The housing structure 2 comprises a first air flow channel 3a for a first flow of air F1, and a second air flow channel 3b for a second flow of air F2. Air is transported from the ambient environment E to the first air flow channel 3a and the second air flow channel 3b, and may pass one or more air filters or similar arrangement before entering the respective first and second air flow channels. The air filter or air filters may for example be arranged in an engine compartment of the vehicle. The air from the ambient environment is transported by one or more fan units to the first air flow channel 3a and the second air flow channel 3b for establishing the first flow of air F1 and the second flow of air F2 in the housing structure 2.

As shown in FIGS. 1A-1C and 2A-2C, a first heat exchanger 4a is arranged in the first air flow channel 3a and a second heat exchanger 4b is arranged in the second air flow channel 3b. The heat exchangers may be of any type and construction suitable for vehicle applications. In the illustrated embodiment, the first heat exchanger 4a is adapted for cooling the first flow of air F1, and the second heat exchanger 4b is adapted for heating the second flow of air F2. As further shown in for example FIGS. 1A-1C and 2A-2C, the extensions of the first air flow channel 3a and the second air flow channel 3b, is forming a third air flow channel 6. A door unit 5 is arranged in the housing structure 2, and the door unit 5 is arranged for distributing the first flow of air F1 in the first air flow channel 3a and the second flow of air F2 in the second air flow channel 3b, as will be further described below. The third air flow channel 6 is arranged for distributing the first flow of air F1 and/or the second flow of air F2 to the passenger compartment C. The system further comprises a fourth air flow channel 7. The fourth air flow channel 7 is arranged for distributing the first flow of air F1 or the second flow of air F2 to the ambient environment E, and when the first flow of air F1 or the second flow of air F2 is entering the fourth air flow channel 7 a fourth flow of air F4 is established in the fourth air flow channel 7. Suitable air channels, air hoses or similar arrangements may be connected to the housing structure 2 for guiding air into the first and second air flow channels from the ambient environment E, from the third air flow channel 6 for further transportation of air from the housing structure 2 to the passenger compartment C, and from the fourth air flow channel 7 for further transportation of air from the housing structure 2 to the ambient environment E.

Figure 1B:
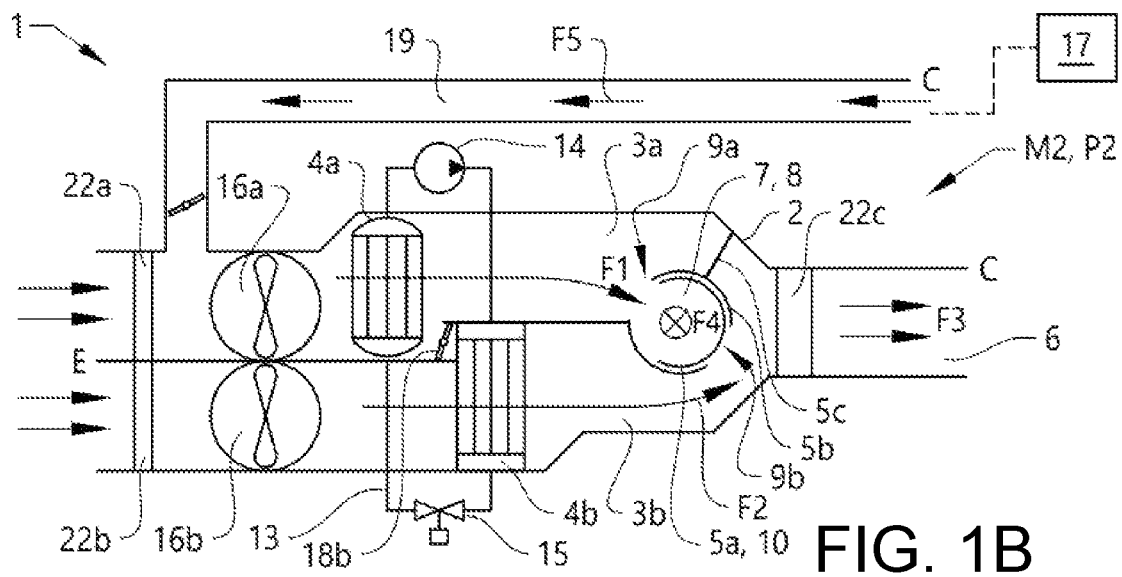
Figure 1C:
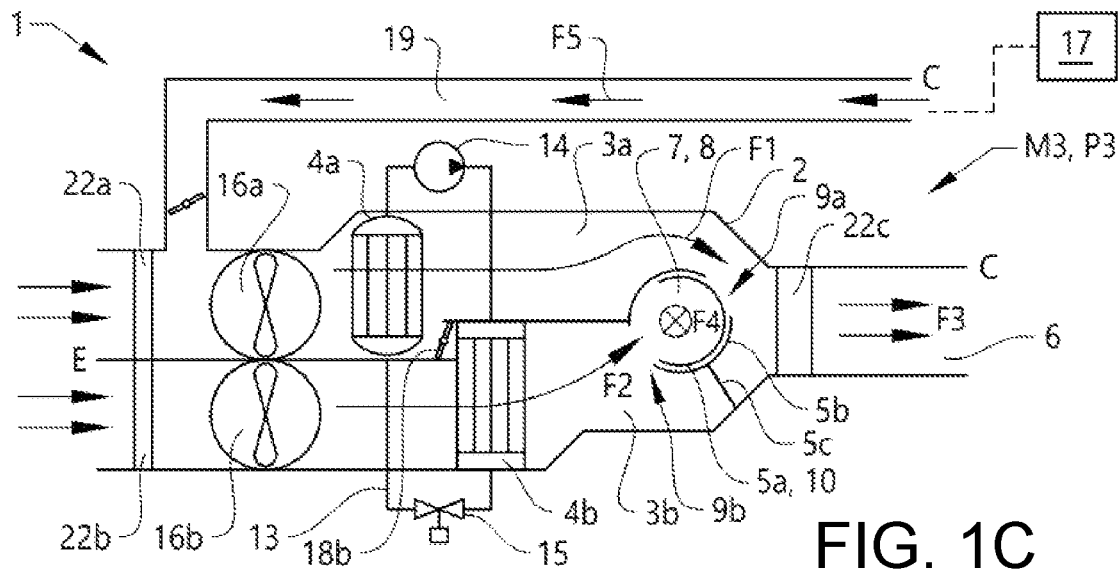
Figure 2A:
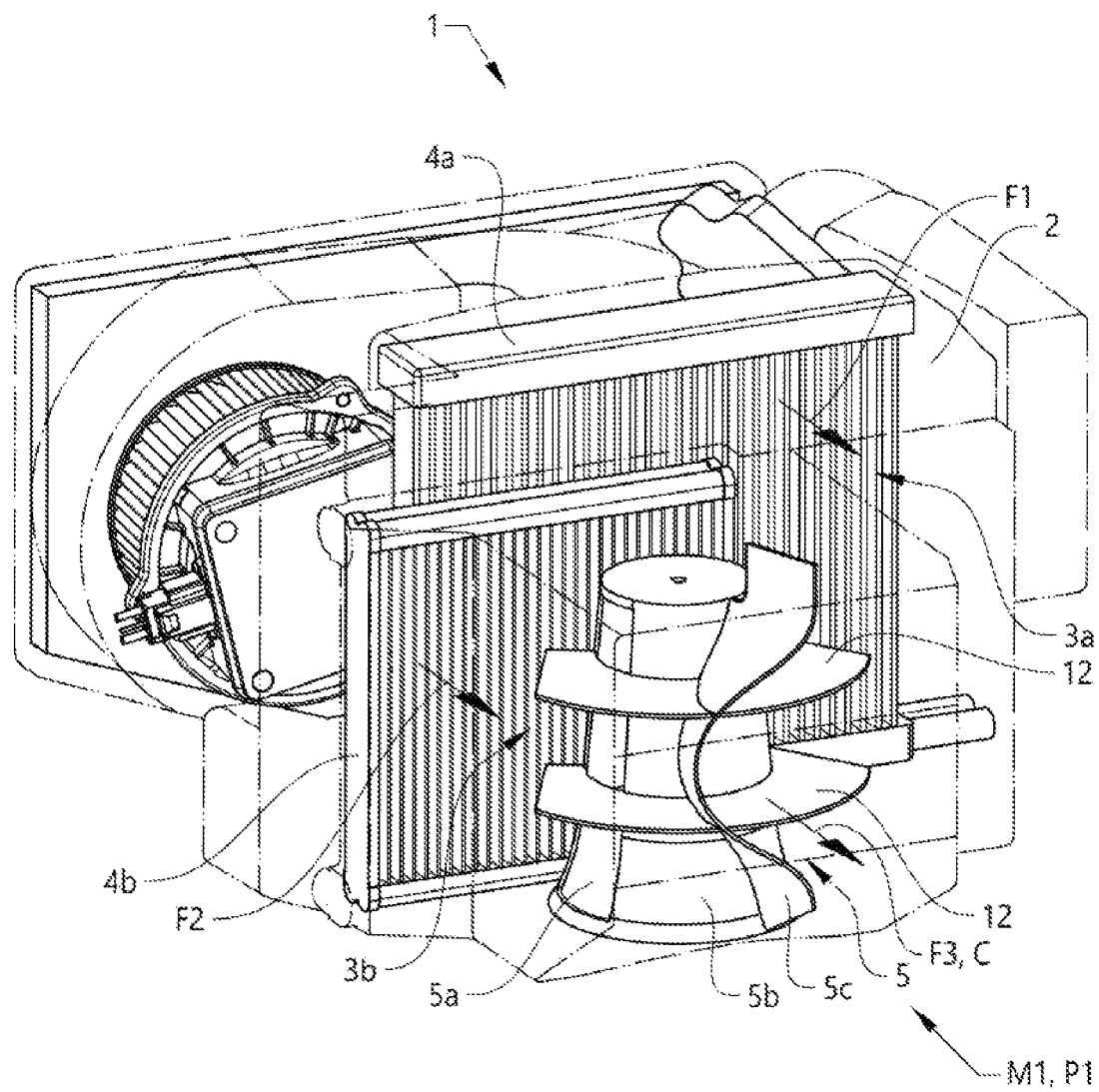
FIG. 2A-2C show schematically, in perspective views, sections of the air conditioning system in a first system operational mode, a second system operational mode, and a third system operational mode, according to the disclosure.
Figure 2B:
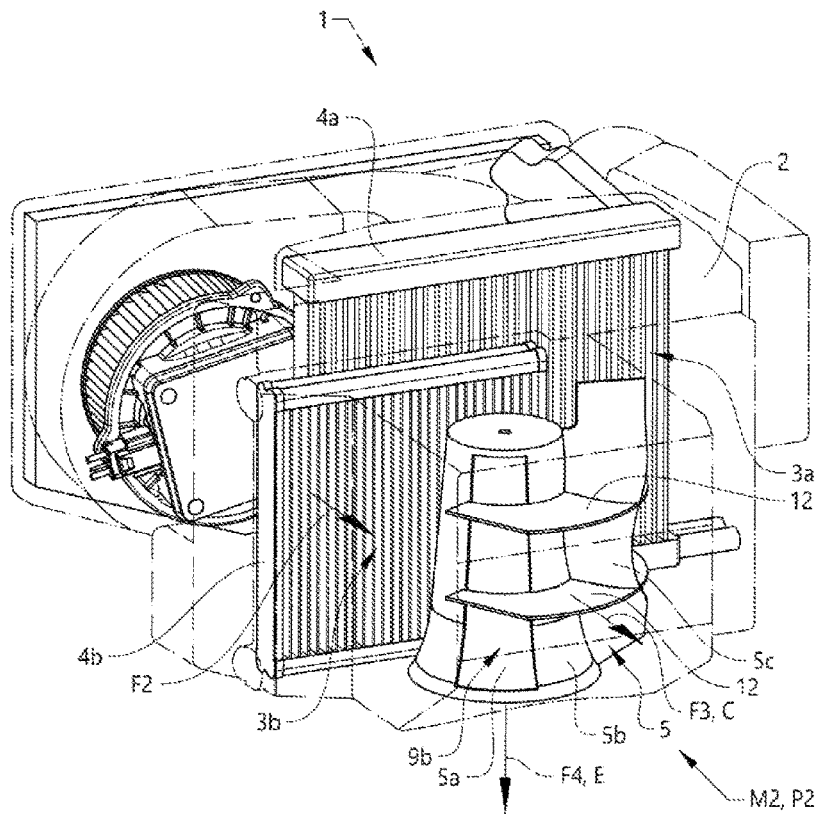
Figure 2C:
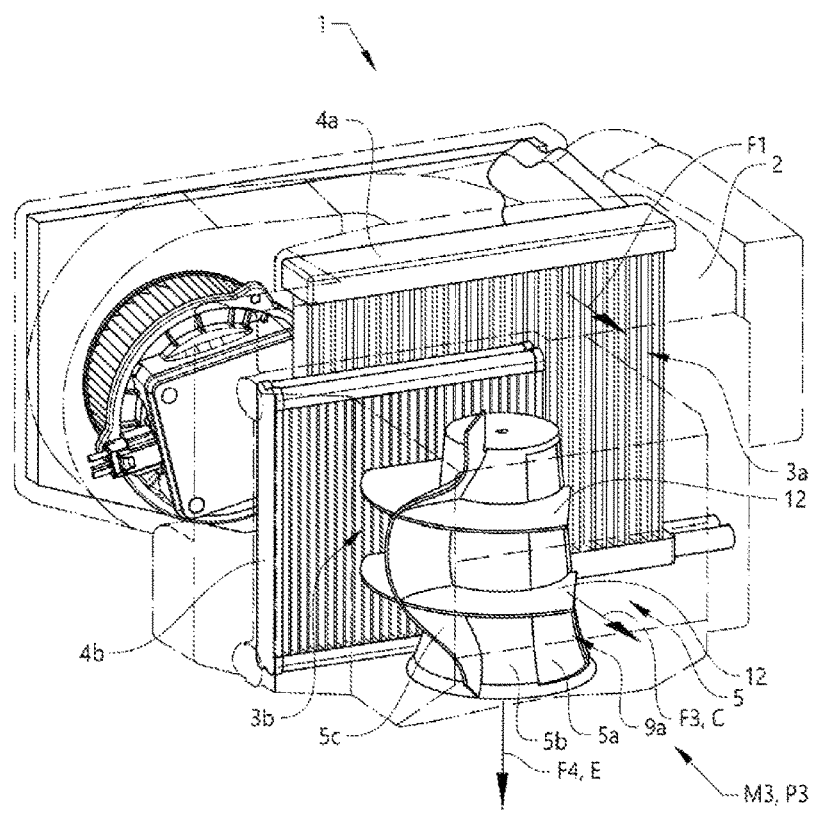
Figure 3A:
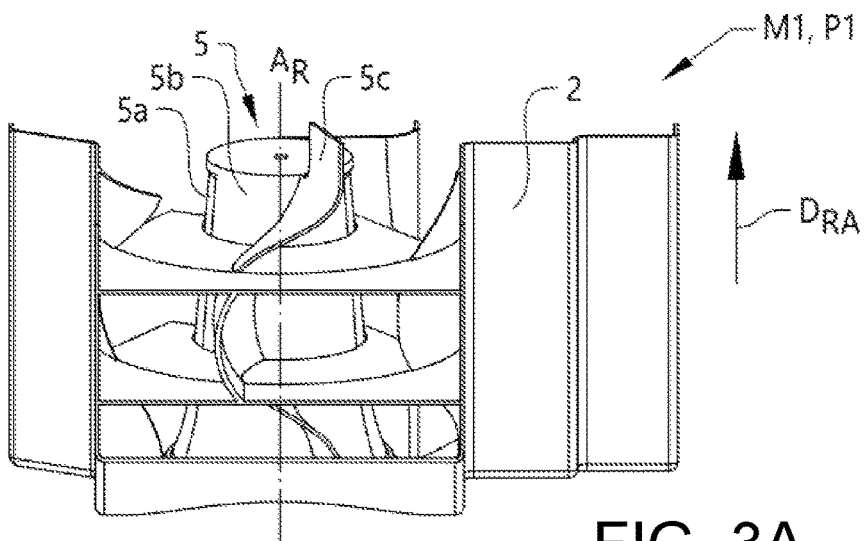
FIG. 3A-3C show schematically, in front perspective views, sections of the air conditioning system in a first system operational mode, a second system operational mode, and a third system operational mode, according to the disclosure.
Figure 3B:
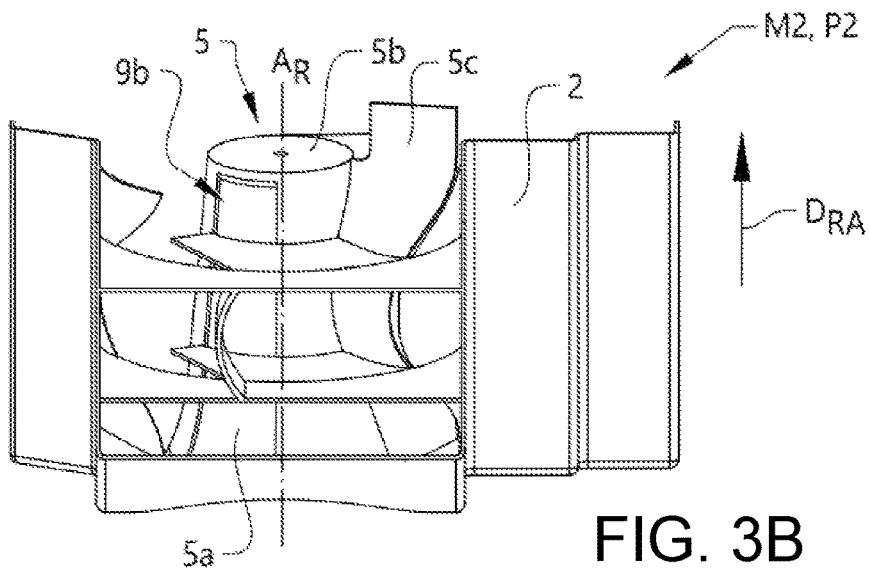
Figure 3C:
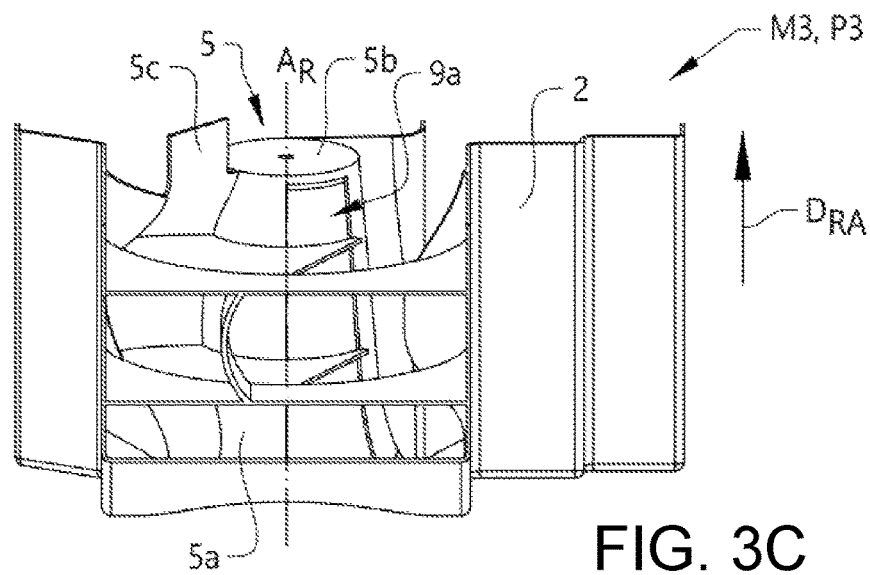
Figure 4A:
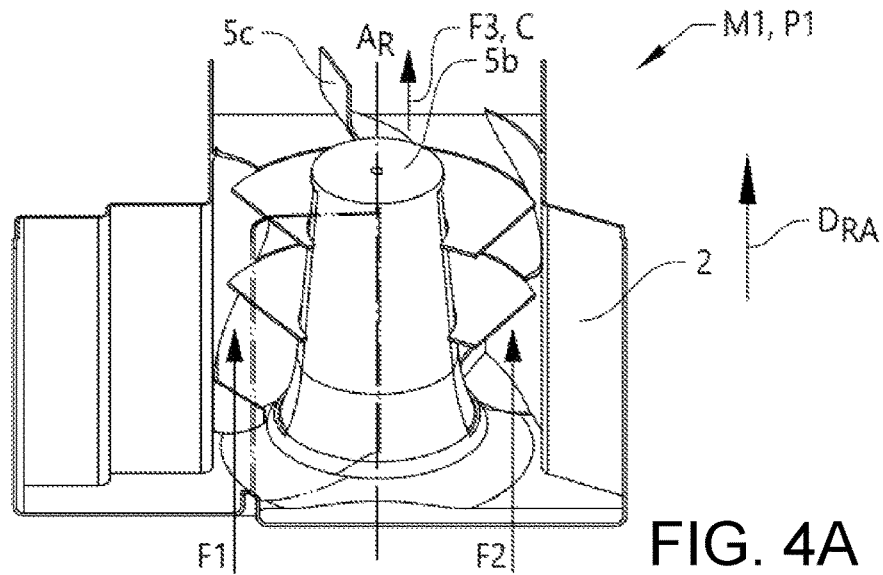
FIG. 4A-4C show schematically, in rear perspective views, sections of the air conditioning system in a first system operational mode, a second system operational mode, and a third system operational mode, according to the disclosure.
Figure 4B:
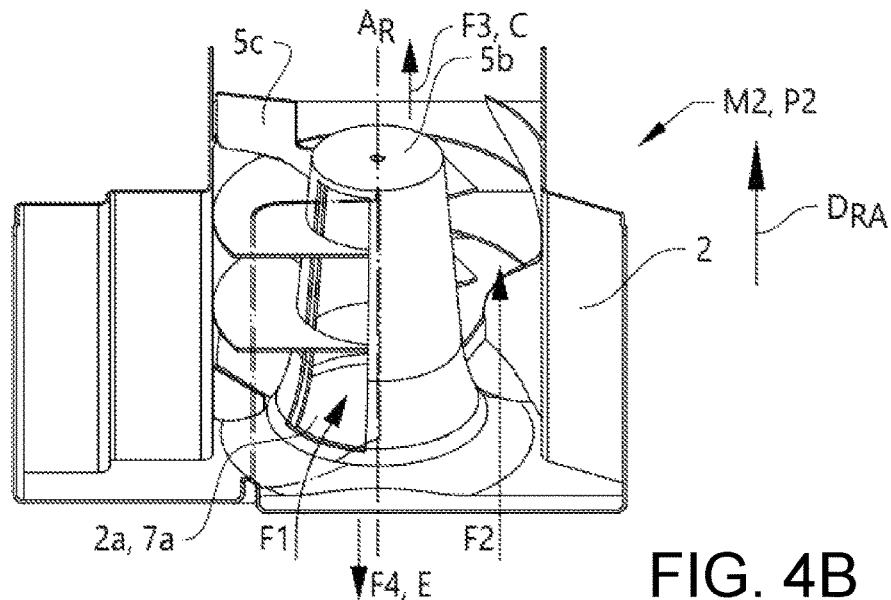
Figure 4C:
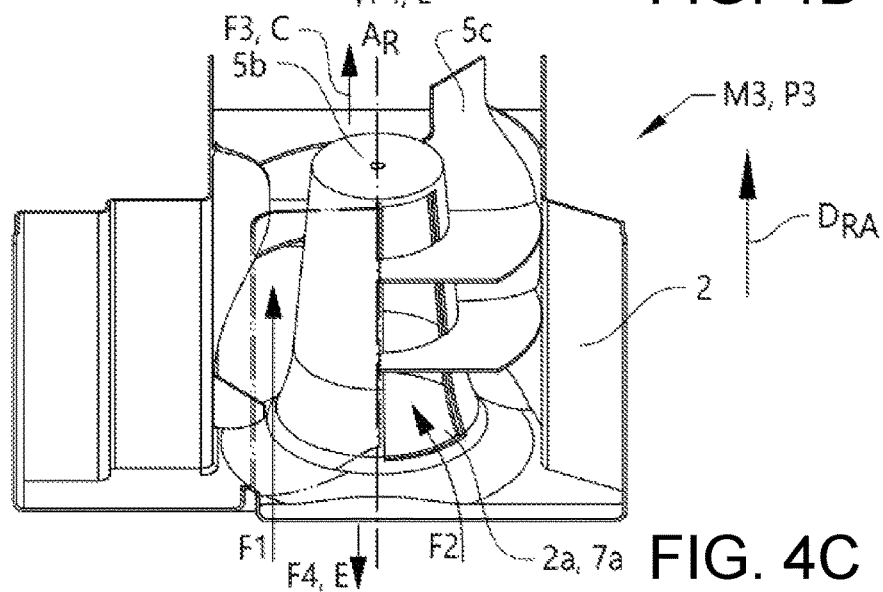

As schematically illustrated in FIGS. 1A-1C, air may if desired be circulated from the passenger compartment C to the first air flow channel 3a. In the embodiment illustrated in FIGS. 1A-1C, a recirculation conduit 19 is arranged between the passenger compartment C and the first air flow channel 3a for the distribution of recycled air. A fifth flow of air F5 is recirculated in the recirculation conduit 19 from the passenger compartment C to the first air flow channel 3a, where the fifth flow of air F5 is mixed with the first flow of air F1. In alternative system embodiments, the recirculation conduit may be omitted if desired.

The air conditioning system 1 further comprises the door unit 5, as schematically illustrated in FIGS. 1A-1C, 2A-2C, 3A-3C, 4A-4C, 5A-5E, 6A-6D, and 7. The system 1 is arranged for working in different system operational modes for distributing the first flow of air F1 and the second flow of air F2, as will be further described below. The door unit 5 is configured for directing the first flow of air F1 and the second flow of air F2 to the passenger compartment C via the third air flow channel 6, as shown in for example FIGS. 1A and 2A. The door unit 5 is further configured for directing the first flow of air F1 and the second flow of air F2 to the passenger compartment C via the third air flow channel 6 and to the ambient environment E via the fourth air flow channel 7, as shown in for example FIGS. 1B-1C and 2B-2C. Thus, the door unit 5 is configured for directing the first flow of air F1 in the first air flow channel 3a and the second flow of air F2 in a second air flow channel 3b to the third air flow channel 6, or to the third air flow channel 6 and the fourth air flow channel 7.

The door unit 5 comprises a stationary inner screen part 5a, an outer casing part 5b, and a flap member 5c, as schematically shown in FIGS. 1A-1C, 2A-2C, 3A-3C, 4A-4C, 5A-5E, 6A-6D, and 7. The inner screen part 5a of the door unit 5 is stationary arranged in relation to the housing structure 2. The outer casing part 5b has a hollow configuration that is encompassing the inner screen part 5a, and the outer casing part 5b is rotatably arranged in relation to the inner screen part 5a between different operational positions in the different system operational modes. In the illustrated embodiments, the inner screen part 5a is arranged inside the outer casing part 5b. The flap member 5c is attached to the outer casing part 5b, and the flap member is arranged for distributing the first flow of air F1 and the second flow of air F2 into the passenger compartment C, depending on the system operational modes of the air conditioning system 1. The flap member 5c is further configured for blocking the first air flow channel 3a or the second air flow channel 3b, depending on the system operational modes. Since the inner screen part 5a is stationary arranged in relation to the housing structure 2, the outer casing part 5b of the door unit 5 is thus rotatably arranged between different operational positions in relation to both the inner screen part 5a and the housing structure 2.

Figure 5A:
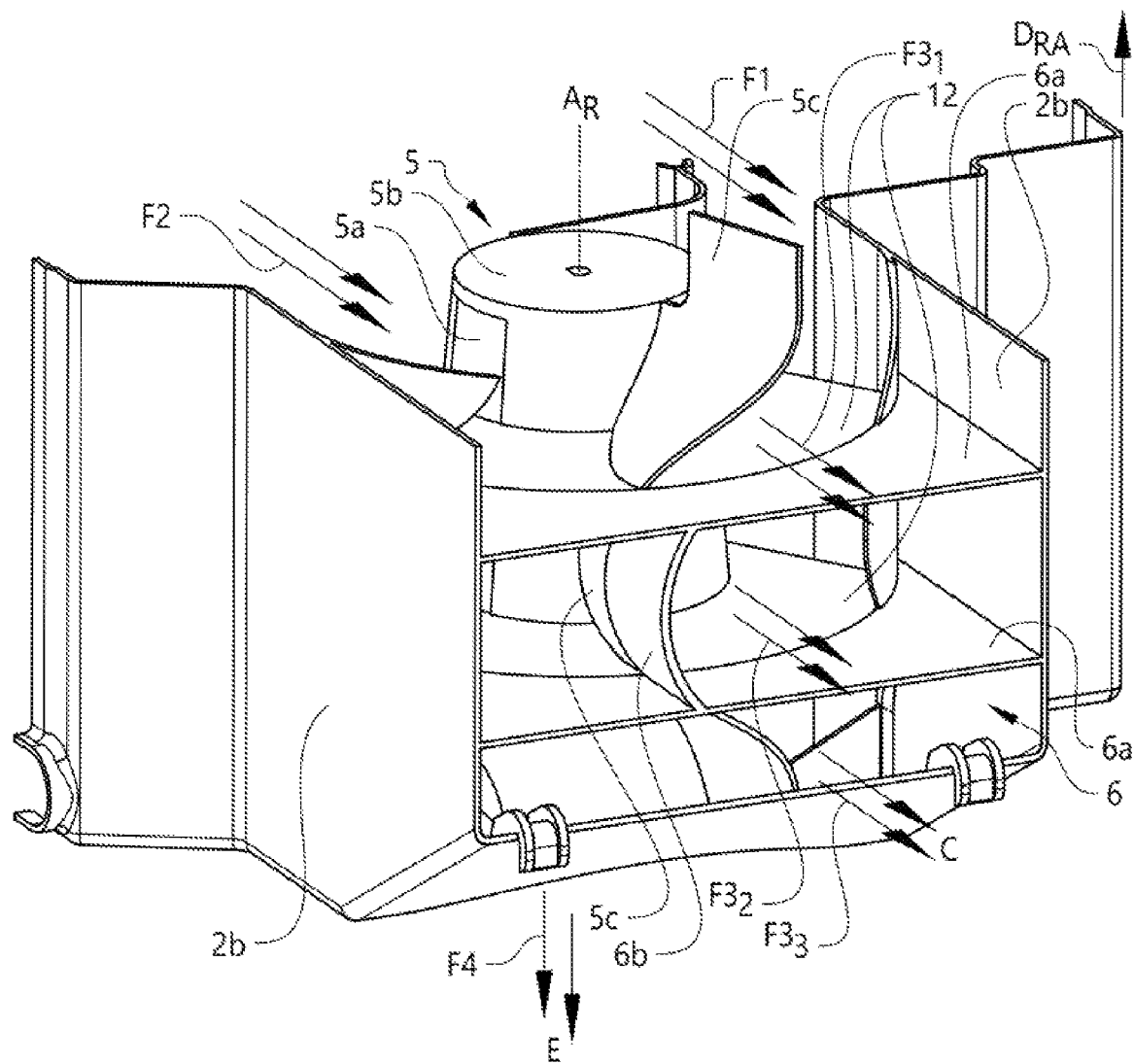
FIG. 5A-5E show schematically, in perspective views and a front view, a door unit and an inner screen part of the air conditioning system according to the disclosure.
Figure 5B:
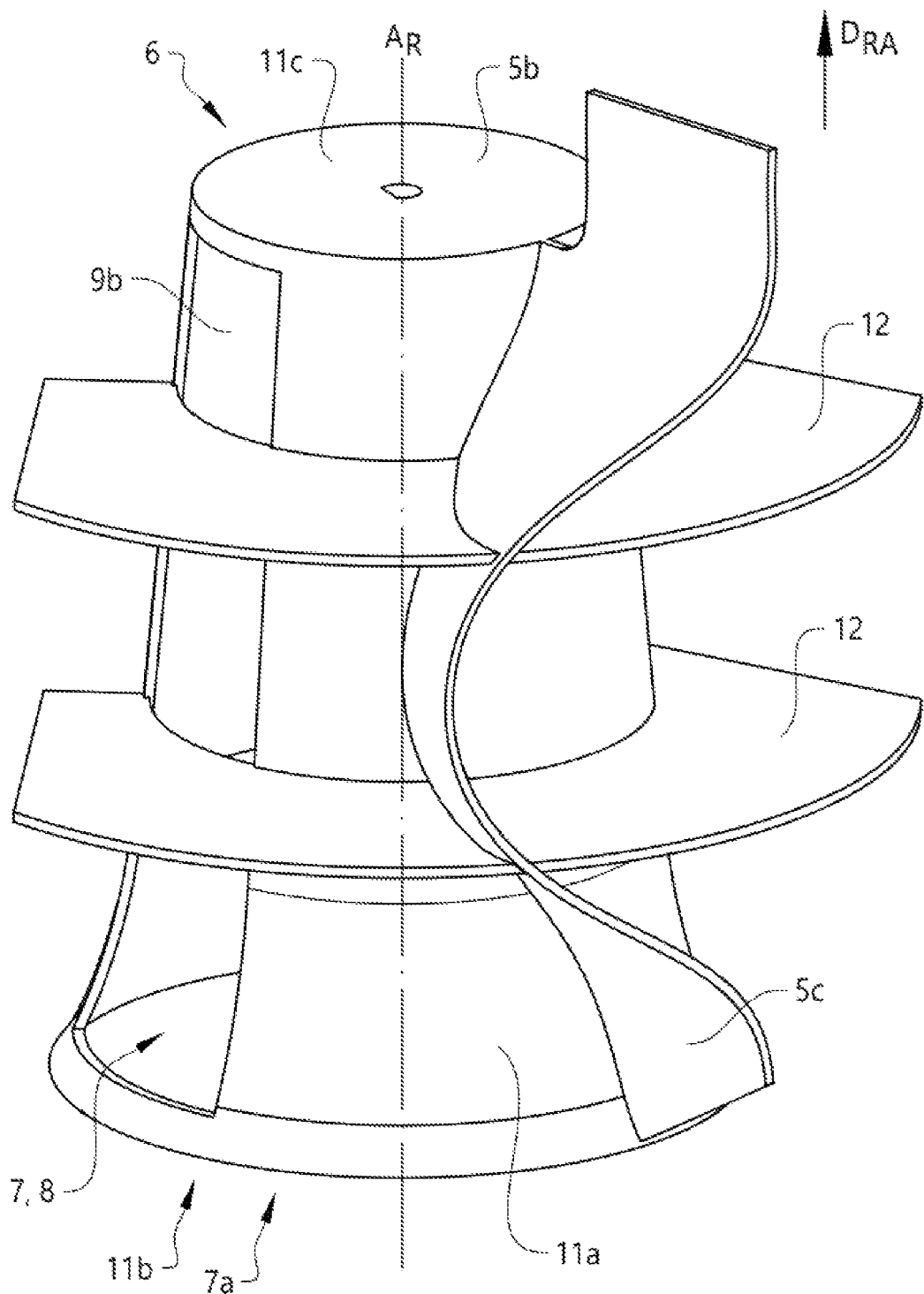

As illustrated in for example FIG. 5B, an internal volume 8 of the door unit 5 enclosed by the inner screen part 5a and the outer casing part 5b is forming the fourth air flow channel 7. With this configuration, the door unit 5 is arranged to direct the first flow of air F1 or the second flow of air F2 into the internal volume 8 forming the fourth air flow channel 7, depending on the system operational modes. The outer casing part 5b comprises a first inlet opening 9a and a second inlet opening 9b. The respective inlet openings are arranged for directing the first flow of air F1 in the first air flow channel 3a or the second flow of air F2 in the second air flow channel 3b into the fourth air flow channel 7, depending on the system operational modes. Thus, the outer casing part 5b of the door unit 5 is configured for directing the first flow of air F1 to the fourth air flow channel 7 via the first inlet opening 9a and for directing the second flow of air F2 to the fourth air flow channel 7 via the second inlet opening 9b.

Figure 5C:
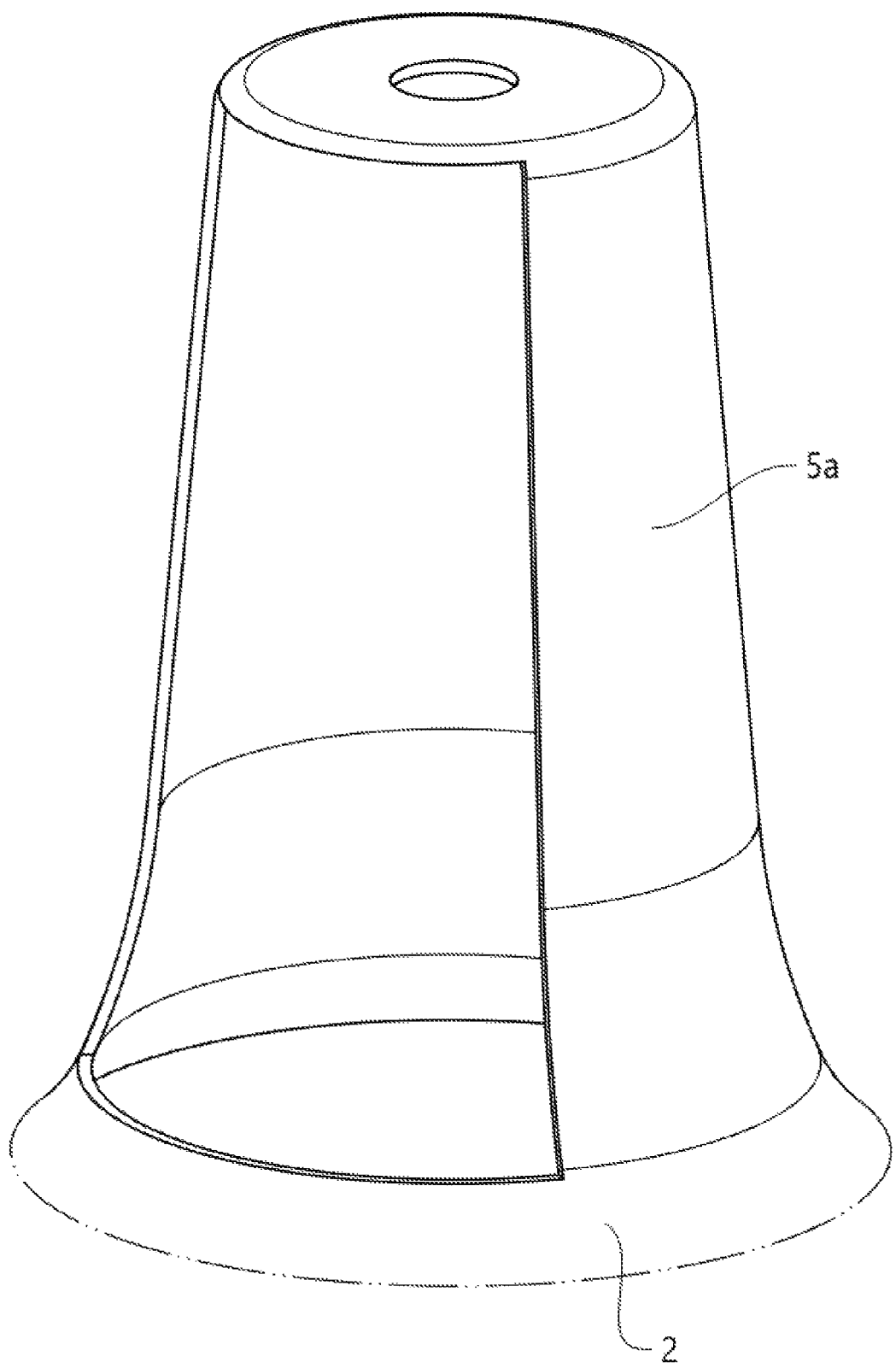
Figure 5D:
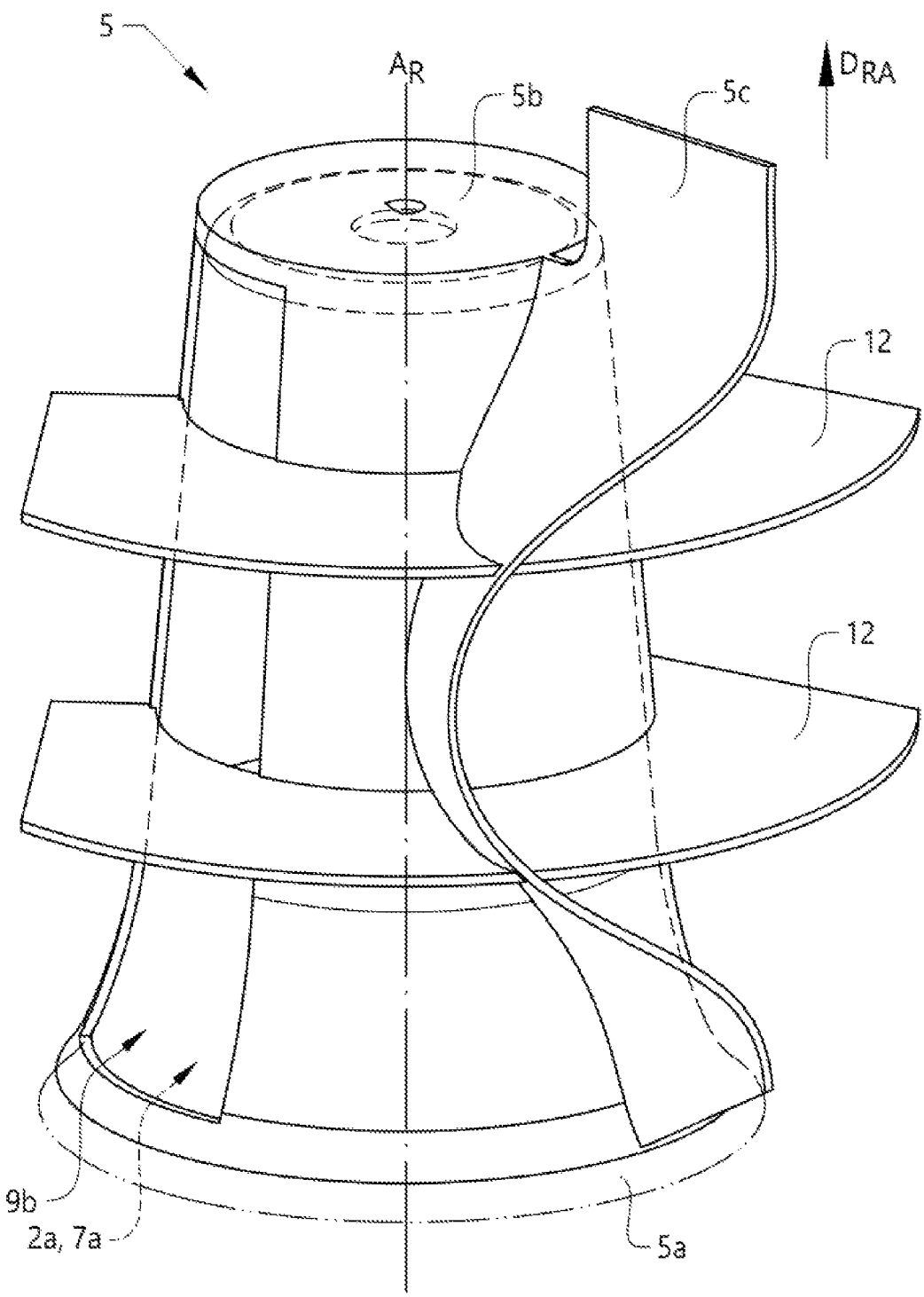
Figure 5E:
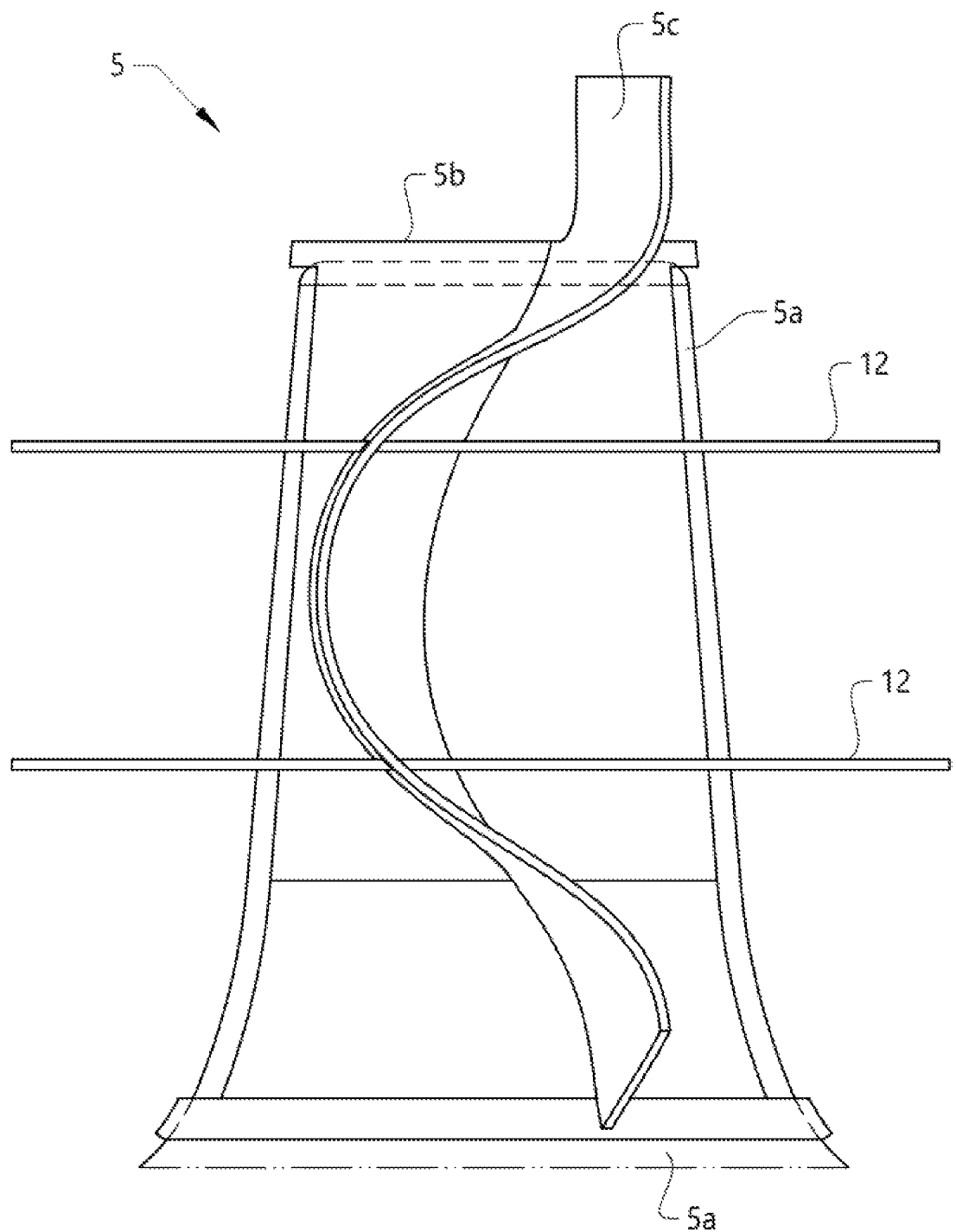

As described above, the outer casing part 5b is rotatably arranged in relation to the inner screen part 5a, and the outer casing part 5b is configured for rotating around a rotational axis $A_R$ extending in a rotational axis direction $D_{RA}$, as shown in for example FIGS. 5A-5B and 5D. The outer casing part 5b may for example be connected to an electric motor or other suitable actuating means for rotating the outer casing part 5b in relation to the inner screen part 5a between different positions. The outer casing part 5b comprises a side wall 11a, an open base part 11b and a top wall 11c, as shown for example in FIG. 5B. The side wall 11a is having an extended configuration in the rotational axis direction $D_{RA}$ and the side wall 11a is extending around the rotational axis $A_R$. The open base part 11b is forming a flow outlet 7a of the fourth air flow channel 7 to the ambient environment E. The housing structure 2 is arranged with a flow outlet opening 2a in connection to the inner screen part 5a corresponding to the flow outlet 7a formed by the open base part 11b for further distribution of the fourth flow of air F4 in the fourth air flow channel 7 to the ambient environment E. The first inlet opening 9a and the second inlet opening 9b are arranged in the side wall 11a. In the shown embodiments, the first inlet opening 9a and the second inlet opening 9b are having elongated configurations extending in the rotational axis direction $D_{RA}$, or extending essentially in the rotational axis direction $D_{RA}$. In the shown embodiments, the first inlet opening 9a and the second inlet opening 9b are having elongated rectangular-like shapes. It should however be understood that in alternative embodiments, the first inlet opening 9a and the second inlet opening 9b may have any suitable configurations or shapes, such as for example round, oval, or any other regular or irregular shapes.

In the embodiments illustrated in the figures, the outer casing part 5b is having a frustoconical-like configuration, and the inner screen part 5a is having a partly frustoconical-like shape that is corresponding to the shape of the outer casing part 5a for an efficient operation of the door unit 5. The inner screen part 5a is thus having a shape that is blocking the flow of air into the first inlet opening 9b and the second inlet opening 9b, or allowing a flow of air into the first inlet opening 9b or into the second inlet opening 9b depending on the rotational position of the outer casing part 5b in relation to the inner screen part 5a. The sections of the inner screen part 5a that are blocking the first inlet opening 9a and the second inlet opening 9b of the outer casing part 5b in the different operational positions should secure a close connection between the parts to prevent any air flow from entering a blocked inlet opening. The inner screen part 5a may thus have a shape that is corresponding to the shape of the outer casing part 5b, where the parts when connected fits snugly to each other for establishing the blocking functionality. In other embodiments, the outer casing part 5b and the inner screen part 5a may have any suitable configuration and shape, depending on the design of the air conditioning system 1. As an example, the outer casing part 5b may instead have a cylindrical-like configuration. The inner screen part 5a may have any suitable shape, as long as the blocking and non-blocking functions of the inlet openings are achieved.

The flap member 5c is attached to the side wall 11a of the outer casing part 5b. The flap member 5c may be arranged as an integrated structural part of the outer casing part 5b, or alternatively arranged as a separate structural part attached to the outer casing part 5b with suitable attachment means. The outer casing part 5b may further comprise one or more guide vanes 12, where the one or more guide vanes 12 are intersecting the flap member 5c. In the embodiments illustrated in for example FIGS. 2A-2C, 5A-5B, and 5D-5E, the outer casing part 5b comprises two guide vanes. However, any suitable number of guide vanes may 12 be used. The guide vanes 12 may also be omitted if desired. The guide vanes 12 are arranged for steering and distributing the first flow of air F1 from the first air flow channel 3a and the second flow of air F2 from the second air flow channel into the third air flow channel 6.

Figure 6A:
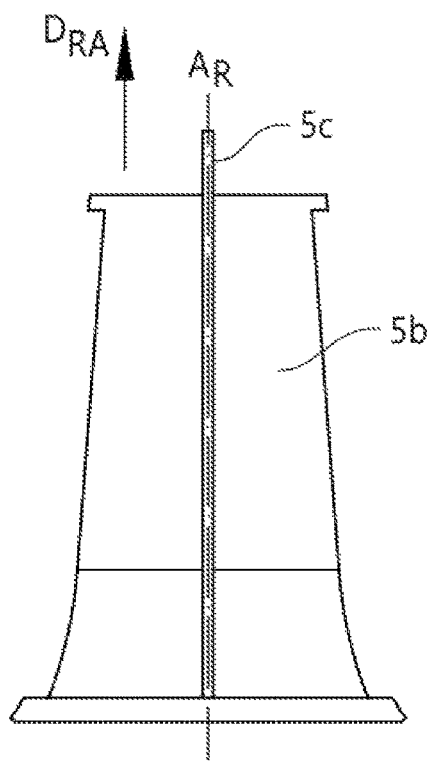
FIG. 6A-6D show schematically, in front views, different embodiments of flap members of the door unit according to the disclosure.
Figure 6B:
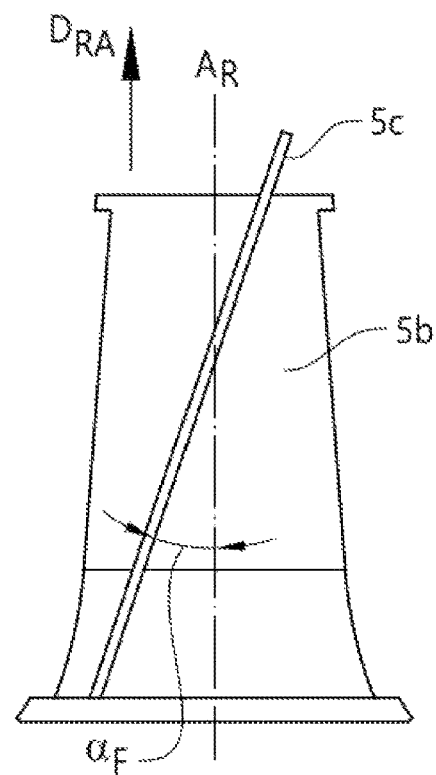
Figure 6C:
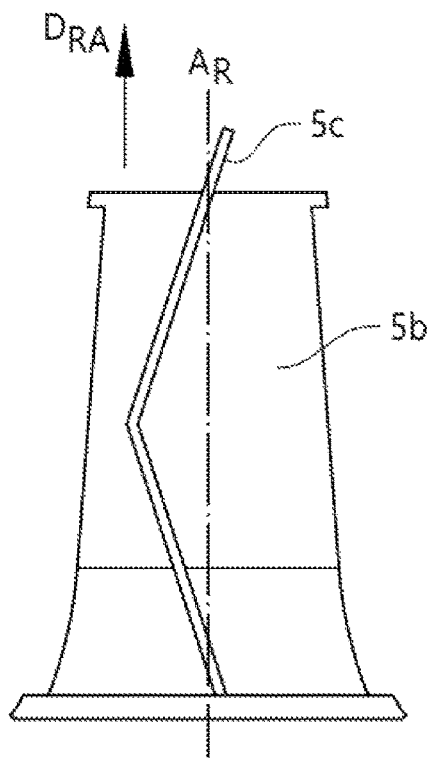
Figure 6D:
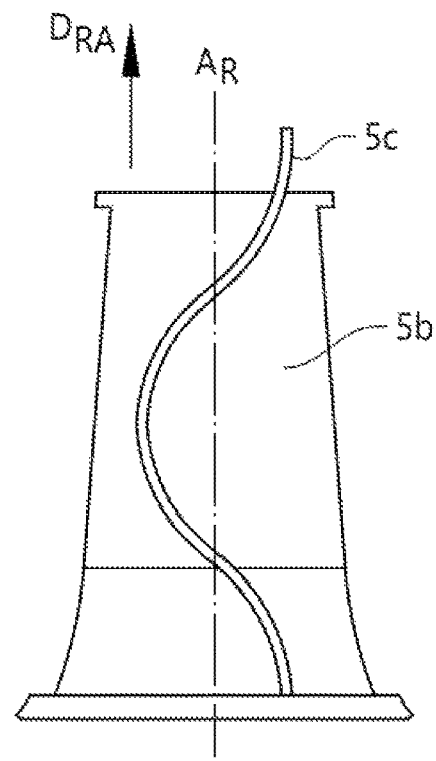

Examples of different embodiments of the flap member 5c are schematically illustrated in front views in FIGS. 6A-6D. In FIG. 6A, the flap member 5c is having a flat configuration with an extension in a plane parallel to the rotational axis direction $D_{RA}$, where the plane is including the rotational axis $A_R$. In FIG. 6B, the flap member 5c is having a flat configuration in a plane arranged at a flap angle $\alpha_F$ in relation to the rotational axis direction $D_{RA}$. In FIG. 6C, the flap member 5c is having a non-planar V-like shaped configuration with an extension in the rotational axis direction $D_{RA}$. In FIG. 6D, the flap member 5c is having a curved non-planar shaped configuration with an extension in the rotational axis direction $D_{RA}$. The non-planar shaped configuration is adapted for controlling an air flow quantity distribution between the first flow of air F1 and the second flow of air F2 in the rotational axis direction $D_{RA}$ into the third air flow channel 6, as will be further described below.

As schematically illustrated in FIG. 5A, the two guide vanes 12 are cooperating with two horizontal separating members 6a arranged in the third air flow channel 6, for an efficient distribution of the first flow of air F1 and/or the second flow of air F2 into the third air flow channel 6. The horizontal separating members 6a are arranged as flat air guiding members connected to and extending between side walls 2b of the housing structure 2, as shown in FIG. 5A. A shaped vertical separating member 6b is arranged between the horizontal separating members 6a for an efficient distribution of the third air flow F3 in the third air flow channel 6. The vertical separating member 6b may for example have a shape corresponding to the shape of the flap member 5c. However, in alternative embodiments, the horizontal separating members 6a and the vertical separating member 6b may have any suitable shape or configuration. The system may be provided with any suitable number of horizontal separating members 6a and vertical separating members 6b.

Through the arrangement with the two guide vanes 12 and the two cooperating separating members 6a, the third flow of air F3 in the third air flow channel 6 can be divided into three sectioned airflows for further distribution to different parts of the passenger compartment C. With reference to the orientation of the system 1 in FIG. 5A, the third air flow F3 can be divided into three different sectioned air flows. An upper first sectioned air flow $F3_1$ may for example be further distributed to the upper areas of the passenger compartment C, such as the windscreen and side windows. A middle second sectioned air flow $F3_2$ may for example be distributed towards the passengers in the passenger compartment C. A lower third sectioned air flow $F3_3$ may for example be distributed towards the lower areas of the passenger compartment C, such as the floor area.

If using a flap member 5c with a flat configuration with an extension in a plane arranged at a flap angle $\alpha_F$ in relation to the rotational axis direction $D_{RA}$, as shown in FIG. 6B, or with a non-planar shaped configuration as shown in FIGS. 6C-6D, the third air flow F3 may have different temperatures in different areas of the third air flow channel 6. As shown in the embodiment illustrated in FIG. 5A, the upper first sectioned air flow $F3_1$ may receive more hot air from the second flow of air F2 than cold air from the first flow of air F1 due to the shaped configuration of the flap member 5c. The middle second sectioned air flow $F3_2$ may receive more cold air from the first flow of air F1 than hot air from the second flow of air F2 due to the shaped configuration of the flap member 5c. The lower third sectioned air flow $F3_3$ may receive more hot air from the second flow of air F2 than cold air from the first flow of air F1 due to the shaped configuration of the flap member 5c. With this configuration of the air flow it is possible to distribute a mix of air towards the driver and passengers in the passenger compartment C that is colder than the mix of air distributed towards the lower and upper regions of the passenger compartment C for an optimal climate comfort.

The inner screen part 5a comprises a screen wall 10 having an extended configuration in the rotational axis direction $D_{RA}$, as for example shown in FIG. 5C. The inner screen part 5a is partly extending around the rotational axis $A_R$, and at least partly encompassing the flow outlet opening 2a of the housing structure 2 described above. Depending on the system operational mode, the inner screen part 5a is blocking one of or both of the first inlet opening 9a and the second inlet opening 9b of the outer casing part 5b. The inner screen part may be arranged as an integrated part of the housing structure 2 extending into the outer casing part 5b, or alternatively be attached to housing structure 2 with suitable attachment means.

The different components of the door unit 5 may be made of any suitable material, such as for example suitable plastic materials, metals, composite materials, or a combination of different materials.

The system 1 further comprises at least one fan unit for establishing the first flow of air F1 in the first air flow channel 3a and the second flow of air F2 in the second air flow channel 3b. In the embodiment illustrated in FIGS. 1A-1C, the system comprises two fan units arranged in each of the first air flow channel 3a and the second air flow channel 3b. A first fan unit 16a is arranged in the first air flow channel 3a for establishing the first flow of air F1, and a second fan unit 16b is arranged in the second air flow channel 3b for establishing the second flow of air F2. The respective fan units may be operated individually for controlling the first flow of air F1 and the second flow of air F2. Through individual operation of the fan units, the air speeds of the first flow of air F1 and the second flow if air F2 can differ for an optimal operation of the air conditioning system 1. With different air speeds from the first fan unit 16a and the second fan unit 16b, the distribution of cold air from the first flow of air F1 in the first air flow channel 3a and hot air from the second flow of air F2 in the second air flow channel 3b can be varied for a suitable mix of cold and hot air to the passenger compartment C. It should be understood that the first flow of air F1 from the first air flow channel 3a and the second flow of air F2 from the second air flow channel 3b may vary depending on the air flow speed from the first fan unit 16a and the second fan unit 16b. The air speeds may also affect the temperature mix of the first air flow F1 and the second air flow F2 into the third air flow channel 6.

In the embodiment illustrated in FIGS. 1A-1C, a first air filter 22a is arranged in the first air flow channel 3a upstream the first heat exchanger 4a, and a second air filter 22b is arranged in the second air flow channel 3b upstream the second heat exchanger 4b. A third air filter 22c is arranged in the third air flow channel 6 downstream the door unit 5. In alternative embodiments, the air filters may be arranged in other locations of the air conditioning system.

The system 1 further comprises a refrigerant circuit 13 for cooling the first flow of air F1 and for heating the second flow of air F2, as shown in FIGS. 1A-1C. The first heat exchanger 4a and the second heat exchanger 4b are integrated into the refrigerant circuit 13, and the first heat exchanger 4a is arranged as an air evaporator in the refrigerant circuit 13 and the second heat exchanger 4b is arranged as an air condenser in the refrigerant circuit 13. The refrigerant circuit 13 further comprises a compressor 14 and an expansion valve 15. The refrigerant circuit 13 may be of a traditional construction with a suitable refrigerant for vehicle applications, where the different components are connected to each other with suitable conduits. The refrigerant circuit 13 illustrated in FIGS. 1A-1C is only schematically shown with the main components of the system.

Figure 8:
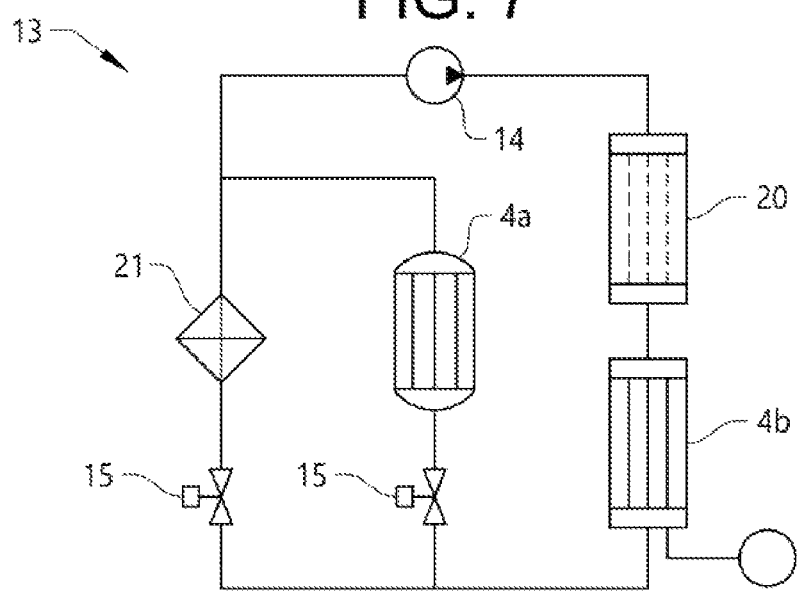
FIG. 8 shows schematically, in a system layout view, a refrigerant circuit according to the disclosure.

The refrigerant circuit 13 may further comprise other components for an efficient operation of the air conditioning system 1, such as for example one or more control valves, accumulating tanks, mufflers, sensors, connectors, and additional heat exchangers. In FIG. 8, an alternative embodiment of the refrigerant circuit 13 is schematically illustrated. In this alternative embodiment, the refrigerant circuit further comprises a water cooled condenser 20 arranged upstream the second heat exchanger 4b, a chiller 21 arranged downstream the second heat exchanger 4b in parallel with the first heat exchanger 4a. As shown in FIG. 8, the system comprises two expansion valves 15 arranged upstream the second heat exchanger 4a and the chiller 21. The first heat exchanger 4a is in this embodiment arranged as an evaporator, and the second heat exchanger 4b is arranged as a condenser. The heat exchangers are arranged within the housing structure 2 in the same way as described in the embodiments above.

The system is designed for being operated in three different system operational modes. In FIGS. 1A, 2A, 3A and 4A, a first system operational mode M1 is illustrated. In FIGS. 1B, 2B, 3B and 4B, a second system operational mode M2 is illustrated. In FIGS. 1C, 2C, 3C and 4C, a third system operational mode M3 is illustrated. In the different system operational modes, the rotational position of the outer casing part 5b of the door unit 5 around the rotational axis $A_R$ in relation to the inner screen part 5a and the housing structure 2 is different. In the first system operational mode M1, the outer casing part 5b is arranged in a first operational position P1 in relation to the inner screen part 5a and the housing structure 2, as shown in FIGS. 1A, 2A, 3A and 4A. In the second system operational mode M2, the outer casing part 5b is arranged in a second operational position P2 in relation to the inner screen part 5a and the housing structure 2, as shown in FIGS. 1B, 2B, 3B and 4B. In the third system operational mode M3, the outer casing part 5b is arranged in a third operational position P3 in relation to the inner screen part 5a and the housing structure 2, as shown in FIGS. 1C, 2C, 3C and 4C.

In the first system operational mode M1, the outer casing part 5b is arranged in the first operational position P1 in relation to the inner screen part 5a, as shown in FIGS. 1A, 2A, 3A and 4A. In the first operational position P1, the inner screen part 5a is blocking the first inlet opening 9a and the second inlet opening 9b preventing the first flow of air F1 and the second flow of air F2 to flow into the fourth air flow channel 7. The flap member 5c is in the first operational position P1 not blocking the first air flow channel 3a or the second air flow channel 3b, allowing both the first flow of air F1 and the second flow of air F2 to flow into the third air flow channel 6. In the first system operational mode M1, the first flow of air F1 and the second flow of air F2 are thus only directed into the third air flow channel 6 to the passenger compartment C. In this system operational mode, the first inlet opening 9a and the second inlet opening 9b of the outer casing part are blocked by the inner screen part, and therefore no air flow can enter the fourth air flow channel 7 formed by the internal volume 8 of the door unit 5 and enclosed by the inner screen part 5a and the outer casing part 5b. The first flow of air F1 and the second flow of air F2 are in the first system operational mode M1 mixed into the third flow of air F3, and the air speeds of the first flow of air F1 and the second flow of air F2 may be varied depending on desired climate in the passenger compartment C. In the first system operational mode M1, no air is thus distributed to the ambient environment E via the fourth air flow channel 7.

In the second system operational mode M2, the outer casing part 5b is arranged in the second operational position P2 in relation to the inner screen part 5a, as shown in FIGS. 1B, 2B, 3B and 4B. In the second operational position P2, the inner screen part 5a is blocking the second inlet opening 9b, and the second flow of air F2 is prevented to flow into the fourth air flow channel 7. Through the rotational position of the outer casing part 5b in relation to the inner screen part 5a, the inner screen part 5a is no longer blocking the first inlet opening 9a, and the first flow of air F1 is allowed to flow into the fourth air flow channel 7. The flap member 5c is in the second operational position P2 blocking the first air flow channel 3a, and the first flow of air F1 is thus prevented from flowing into the third air flow channel 6. The blocking of the first air flow channel 3a by the flap member 5c is efficiently preventing the first flow of air F1 in the first air flow channel 3a to flow into the third air flow channel 6, but since the first inlet opening 9a is no longer blocked by the inner screen part 5a, the first flow of air F1 is instead directed into the fourth air flow channel 7. The flap member 5c is in the second operational position P2 allowing the second flow of air F2 to flow into the third air flow channel 6. In the second system operational mode M2, the second flow of air F2 from the second air flow channel 3b is forming the third flow of air F3 in the third air flow channel 6 to the passenger compartment C, and the first flow of air F1 from the first air flow channel 3a is forming the fourth flow of air F4 in the fourth air flow channel 7 to the ambient environment E.

In the third system operational mode M3, the outer casing part 5b is arranged in the third operational position P3 in relation to the inner screen part 5a, as shown in FIGS. 1C, 2C, 3C and 4C. In the third operational position P3, the inner screen part 5a is blocking the first inlet opening 9a, and the first flow of air F1 is prevented to flow into the fourth air flow channel 7. Through the rotational position of the outer casing part 5b in relation to the inner screen part 5a, the inner screen part 5a is no longer blocking the second inlet opening 9b, and the second flow of air F2 is allowed to flow into the fourth air flow channel 7. The flap member 5c is in the third operational position P3 blocking the second air flow channel 3b, and the second flow of air F2 is thus prevented from flowing into the third air flow channel 6. The blocking of the second air flow channel 3b by the flap member 5c is efficiently preventing the second flow of air F2 in the second air flow channel 3b to flow into the third air flow channel 6, but since the second inlet opening 9b is no longer blocked by the inner screen part 5a, the second flow of air F2 is instead directed into the fourth air flow channel 7. The flap member 5c is in the third operational position P3 allowing the first flow of air F1 to flow into the third air flow channel 6. In the third system operational mode M3, the first flow of air F1 from the first air flow channel 3a is forming the third flow of air F3 in the third air flow channel 6 to the passenger compartment C, and the second flow of air F2 from the second air flow channel 3b is forming the fourth flow of air F4 in the fourth air flow channel 7 to the ambient environment E.

The system may further comprise a control unit 17, where the control unit 17 is arranged for controlling the different components of the air conditioning system 1, such as for example air flow speeds via the fan units, air temperatures from the heat exchangers and door unit positions, as well as the operation of the system 1 in different system operational modes described. The control unit 17 is connected to the air conditioning system and may form part of other vehicle control systems. The control unit may comprise suitable software and one or more processors, as well as hardware components for controlling the air conditioning system 1. The control unit 17 may further be connected to one or more suitable sensors arranged in the passenger compartment C or in other positions of the vehicle for detecting environmental conditions and other conditions, such as for example temperatures, air humidity, exposure to sunlight, movements in the passenger compartment, fan speeds, and air flow velocities.

When operating the air conditioning system 1, the control unit 17 is collecting information from the different sensors, and based upon detected environmental conditions, the first flow of air F1 and the second flow of air F2 are controlled by arranging the outer casing part 5b with the flap member 5c into the different operational positions. If a flow of mixed cold and hot air should be distributed into the passenger compartment C, based on detected environmental conditions, the system is configured in the first system operational mode M1. In the first system operational mode M1, the outer casing part 5b is rotated into its first operational position P1 in relation to the inner screen part 5a, and in the first operational position P1 the inner screen part 5a is blocking the first inlet opening 9a and the second inlet opening 9b preventing the first flow of air F1 and the second flow of air F2 to flow into the fourth air flow channel 7. The flap member 5c is in the first operational position P1 allowing the first flow of air F1 and the second flow of air F2 to flow into the third air flow channel 6 to the passenger compartment C. If a flow of hot air should be distributed into the passenger compartment C, based on detected environmental conditions, the system is configured in the second system operational mode M2. In the second system operational mode M2, the outer casing part 5b is rotated into the second operational position P2 in relation to the inner screen part 5a. In the second operational position P2, the inner screen part 5a is blocking the second inlet opening 9b preventing the second flow of air F2 to flow into the fourth air flow channel 7 and allowing the first flow of air F1 to flow into the fourth air flow channel 7. The flap member 5c is in the second operational position P2 blocking the first air flow channel 3a preventing the first flow of air F1 to flow into the third air flow channel 6 and allowing the second flow of air F2 to flow into the third air flow channel 6. If a flow of cold air should be distributed into the passenger compartment C, based on detected environmental conditions, the system is configured in the third system operational mode M3. In the third system operational mode M3, the outer casing part 5b is rotated into the third operational position P3 in relation to the inner screen part 5a. In the third operational position P3, the inner screen part 5a is blocking the first inlet opening 9a preventing the first flow of air F1 to flow into the fourth air flow channel 7 and allowing the second flow of air F2 to flow into the fourth air flow channel 7. The flap member 5c is in the third operational position P3 blocking the second air flow channel 3b preventing the second flow of air F2 to flow into the third air flow channel 6 and allowing the first flow of air F1 to flow into the third air flow channel 6.

Figure 7:
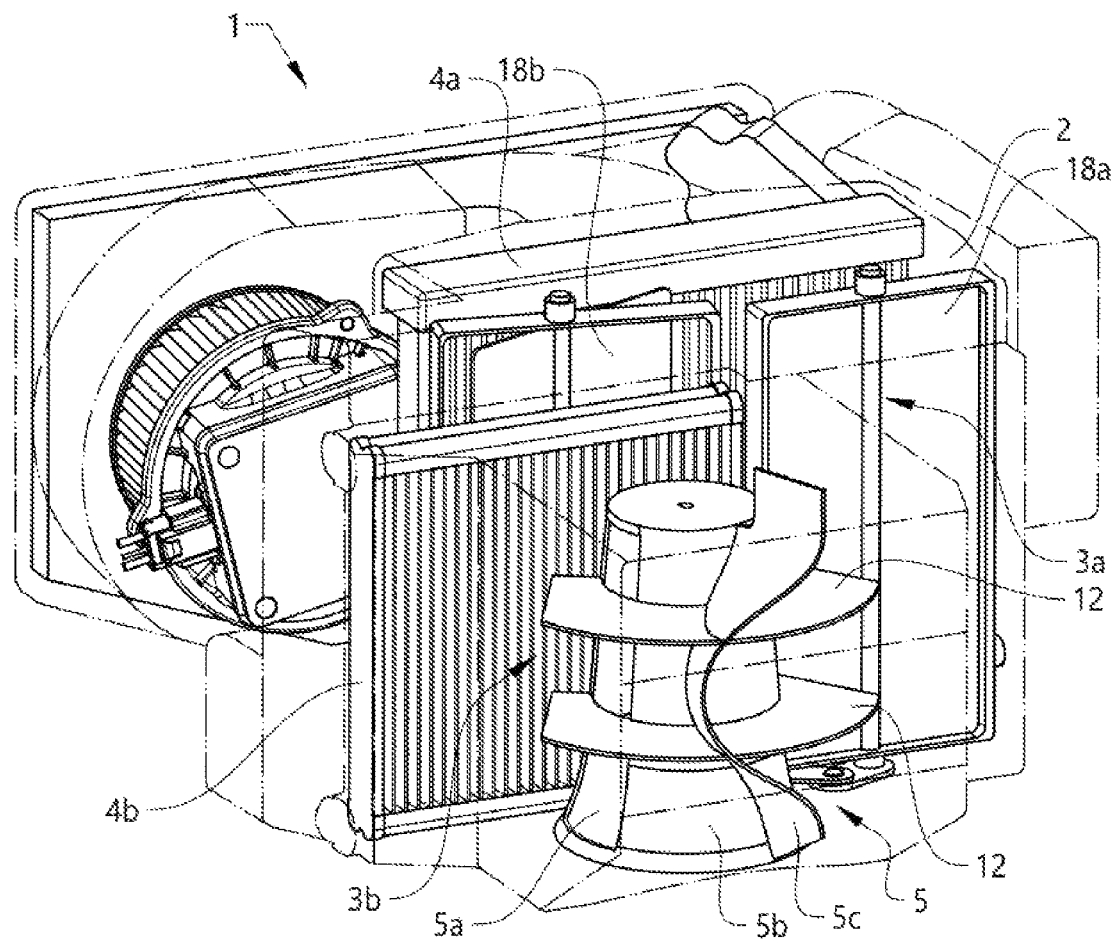
FIG. 7 shows schematically, in a perspective view, a section of the air conditioning system in a first system operational mode according to another embodiment of the disclosure.

In FIG. 7, an alternative embodiment of the air conditioning system 1 is schematically illustrated. In this embodiment, the system further comprises two additional air control flaps, where a first air control flap 18a is arranged in the first air flow channel 3a and a second air control flap 18b is arranged between the first air flow channel 3a and the second air flow channel 3b. The flaps can be used to direct the flow of cold air after the first heat exchanger 4a in the first air flow channel 3a into the second air flow channel 3b before the second heat exchanger 4b. This setup may be used if there is a need to dry air before heating the air. During the cooling of the air, the air is dried and the dried air is further distributed into the second heat exchanger 4a for being heated. The first air control flap 18a and the second air control flap 18b can be closed and opened in different positions. When opening the second air control flap 18b, the first flow of air F1 in the first air flow channel 3a is allowed to flow into the second air flow channel 3b, where it is mixed with the second flow of air F2. When closing the second air control flap 18b, the first air flow channel 3a and the second air flow channel 3b are completely separated. When the first air control flap 18a is closed, all air in the first air flow channel 3a is directed into the second air flow channel 3b when the second air control flap 18b is in the open position. When the first air control flap 18a is opened, and the second air control flap 18b is opened, the air in the first air flow channel 3a is allowed to flow both into the second air flow channel 3b and to the door unit 5 for further transportation as described above. The air in the second air flow channel 3b is transported to the door unit 5 for further transportation as described above. The system may alternatively be configured with only the second air control flap 18b, as schematically illustrated in FIGS. 1A-1C, for distribution of air from the first air flow channel 3a to the second air flow channel 3b.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the air conditioning system 1 and the control unit 17, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processor or processors associated with the air conditioning system 1 and the control unit 17 may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1 Air conditioning system
2 Housing structure
2a Flow outlet opening, Housing structure
2b Side wall, Housing structure
3a First air flow channel
3b Second air flow channel
4a First heat exchanger
4b Second heat exchanger
5 Door unit
5a Inner screen part
5b Outer casing part
5c Flap member
6 Third air flow channel
6a Horizontal separating member
6b Vertical separating member
7 Fourth air flow channel
7a Flow outlet, Fourth air flow channel
8 Internal volume
9a First inlet opening, Outer casing part 9b Second inlet opening, Outer casing part
10 Screen wall, Inner screen part
11a Side wall, Outer casing part
11b Base part, Outer casing part
11c Top wall, Outer casing part
12 Guide vane
13 Refrigerant circuit
14 Compressor
15 Expansion valve
16a First fan unit
16b Second fan unit
17 Control unit
18a First air control flap
18b Second air control flap
19 Recirculation conduit
20 Water cooled condenser
21 Chiller
22a First air filter
22b Second air filter
22c Third air filter
$\alpha_F$ Flap angle
$A_R$ Rotational axis
C Passenger compartment
$D_{RA}$ Rotational axis direction
E Ambient environment
F1 First flow of air
F2 Second flow of air
F3 Third flow of air
F4 Fourth flow of air
F5 Fifth flow of air
M1 First system operational mode
M2 Second system operational mode
M3 Third system operational mode
P1 First operational position
P2 Second operational position
P3 Third operational position

What is claimed is:

1. A door unit for an air conditioning system, comprising:
a stationary and solid inner screen part,
an outer casing part surrounding the inner screen part and having a first inlet opening and a second inlet opening, the outer casing part rotatable among different operational positions in relation to the inner screen part by rotation about a rotational axis of the outer casing part, and
a flap member attached to the outer casing part,
wherein, in a first operational position of the outer casing part, the flap member is positioned to allow passage of both a first flow of air from a first air flow channel upstream of the door unit and a second flow of air from a second air flow channel upstream of the door unit and separate from the first air flow channel into a third air flow channel downstream of the door unit,
wherein, in a second operational position of the outer casing part, the flap member is positioned to block the first flow of air from the first air flow channel from entering the third air flow channel and allow the second flow of air from the second air flow channel to enter the third air flow channel, and the outer casing part is positioned to allow the first flow of air from the first air flow channel to enter an internal volume of the door unit via the first inlet opening, the internal volume being enclosed by the inner screen part and the outer casing part, and wherein the internal volume forms a fourth air flow channel,
wherein, in a third operational position of the outer casing part, the flap member is positioned to allow the first flow of air from the first air flow channel to enter the third air flow channel and to block the second flow of air from the second air flow channel from entering the third air flow channel, and the outer casing part is positioned to allow the second flow of air from the second air flow channel to enter the fourth air flow channel via the second inlet opening.

2. The door unit according to claim 1, wherein:
the inner screen part comprises a screen wall having an extended configuration in a rotational axis direction of the rotational axis and the inner screen part partly extends circumferentially around the rotational axis, and
the outer casing part comprises a side wall, an open base part, and a top wall, wherein the side wall has an extended configuration in the rotational axis direction and extends around the rotational axis, wherein the base part forms a flow outlet of the fourth air flow channel to the ambient environment.

3. The door unit according to claim 2, wherein the first inlet opening and the second inlet opening are arranged in the side wall, wherein the first inlet opening and the second inlet opening have elongated configurations extending in the rotational axis direction.

4. The door unit according to claim 1, wherein the outer casing part has a frustoconical configuration or a cylindrical configuration.

5. The door unit according to claim 1, wherein the flap member has a flat configuration with an extension in a plane parallel to a rotational axis direction of the rotational axis or in a plane arranged at a flap angle in relation to the rotational axis direction.

6. The door unit according to claim 1, wherein the flap member has a non-planar shaped configuration with an extension in a rotational axis direction of the rotational axis.

7. The door unit according to claim 1, wherein the outer casing part comprises one or more guide vanes that intersect the flap member.

8. An air conditioning system for the treatment of air to a passenger compartment of a vehicle, wherein the system comprises:
a housing structure having the first air flow channel, the second air flow channel, and the third air flow channel,
a first heat exchanger arranged in the first air flow channel and a second heat exchanger arranged in the second air flow channel,
the door unit according to claim 1, wherein the door unit is configured for selectively delivering one or both of the first flow of air or the second flow of air to the passenger compartment via the third air flow channel depending on the first, second, or third operational position of the outer casing part, and wherein airflow entering the fourth air flow channel in the second and third operational positions is exhausted to an ambient environment.

9. The air conditioning system according to claim 8, wherein the first heat exchanger is adapted for cooling the first flow of air and the second heat exchanger is adapted for heating the second flow of air.

10. The air conditioning system according to claim 8, wherein the system further comprises a refrigerant circuit, wherein the first heat exchanger and the second heat exchanger are integrated into the refrigerant circuit, wherein the first heat exchanger is arranged as an air evaporator in the refrigerant circuit and the second heat exchanger is arranged as an air condenser in the refrigerant circuit, wherein the refrigerant circuit further comprises a compressor and an expansion valve.

11. The air conditioning system according to claim 8, wherein the system further comprises at least one fan unit configured for establishing the first flow of air in the first air flow channel and the second flow of air in the second air flow channel.

12. The air conditioning system according to claim 11, wherein a first fan unit is arranged in the first air flow channel for establishing the first flow of air and a second fan unit is arranged in the second air flow channel for establishing the second flow of air.

13. The door unit according to claim 1, wherein in the first operational position, the outer casing part is arranged in relation to the inner screen part so that the inner screen part blocks the first inlet opening and the second inlet opening and prevents the first flow of air and the second flow of air from entering into the fourth air flow channel.

14. The door unit according to claim 1, wherein in the second operational position, the outer casing part is arranged in relation to the inner screen part so that the inner screen part blocks the second inlet opening and prevents the second flow of air from entering the fourth air flow channel.

15. The door unit according to claim 1, wherein in the third operational position, the outer casing part is arranged in relation to the inner screen part so that the inner screen part blocks the first inlet opening and prevents the first flow of air from entering the fourth air flow channel.

16. A method for operating the air conditioning system of claim 8 for the treatment of air to a passenger compartment of a vehicle, comprising:
    detecting environmental conditions; and
    based on the detected environmental conditions, controlling movement of the outer casing part to move from one of the operational positions to another of the operational positions.

17. The door unit according to claim 1, wherein airflow entering the fourth air flow channel in the second and third operational positions is exhausted to an ambient environment.

* * * * *